United States Patent
Kawamura et al.

(10) Patent No.: US 6,877,493 B2
(45) Date of Patent: Apr. 12, 2005

(54) VARIABLE OPERATION INTAKE VALVE CONTROLLING APPARATUS AND METHOD FOR INTERNAL COMBUSTION ENGINE

(75) Inventors: Katsuhiko Kawamura, Yokohama (JP); Takeshi Etou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/609,651

(22) Filed: Jul. 1, 2003

(65) Prior Publication Data

US 2004/0031457 A1 Feb. 19, 2004

(30) Foreign Application Priority Data

Aug. 15, 2002 (JP) ........................................ 2002-236738

(51) Int. Cl.[7] ............................ F02M 25/07; F01L 1/34
(52) U.S. Cl. ................................. 123/568.14; 123/90.16
(58) Field of Search ........................... 123/90.15, 90.16, 123/90.17, 90.18, 568.14

(56) References Cited

U.S. PATENT DOCUMENTS

| | | | | |
|---|---|---|---|---|
| 6,401,675 | B1 | * | 6/2002 | Nakamura et al. ....... 123/90.15 |
| 6,408,806 | B2 | * | 6/2002 | Sugiyama et al. ....... 123/90.15 |
| 6,513,467 | B2 | * | 2/2003 | Nohara et al. ........... 123/90.15 |
| 6,550,436 | B2 | * | 4/2003 | Nohara et al. ........... 123/90.16 |
| 6,584,956 | B2 | * | 7/2003 | Machida .................. 123/90.15 |
| 2002/0046741 | A1 | * | 4/2002 | Kakuho et al. ......... 123/568.14 |
| 2002/0092488 | A1 | * | 7/2002 | Aoyama et al. ......... 123/90.16 |
| 2002/0129780 | A1 | * | 9/2002 | Nohara et al. ........... 123/90.16 |

FOREIGN PATENT DOCUMENTS

| | | |
|---|---|---|
| JP | 2001-221105 A | 8/2001 |
| JP | 2001-263104 A | 9/2001 |
| JP | 2001-280167 A | 10/2001 |
| JP | 2002-89303 A | 3/2002 |

OTHER PUBLICATIONS

U.S. Appl. No. 10/452,252, filed Jun. 3, 2003, Kawamura et al.

* cited by examiner

Primary Examiner—Willis R. Wolfe, Jr.
(74) Attorney, Agent, or Firm—Foley & Lardner LLP

(57) ABSTRACT

In variable operation intake valve controlling apparatus and method for an internal combustion engine, using both of a cam operational angle variable mechanism and a cam phase variable mechanism, a controller controls an intake air quantity in accordance with valve timings of the intake valve determined according to the operational angle through the cam operational angle variable mechanism and the phase through the cam phase variable mechanism, the controller determining an allowable residual gas quantity from a required air quantity and an engine speed, the required air quantity being determined according to a manipulated variable of an accelerator, calculating optimum intake valve open and closure timings (IVO and IVC) in such a manner that both of the required air quantity and the allowable residual gas quantity enter a cylinder of the engine, and determining the operational angle and the phase from the optimum intake valve open and closure timings.

15 Claims, 11 Drawing Sheets

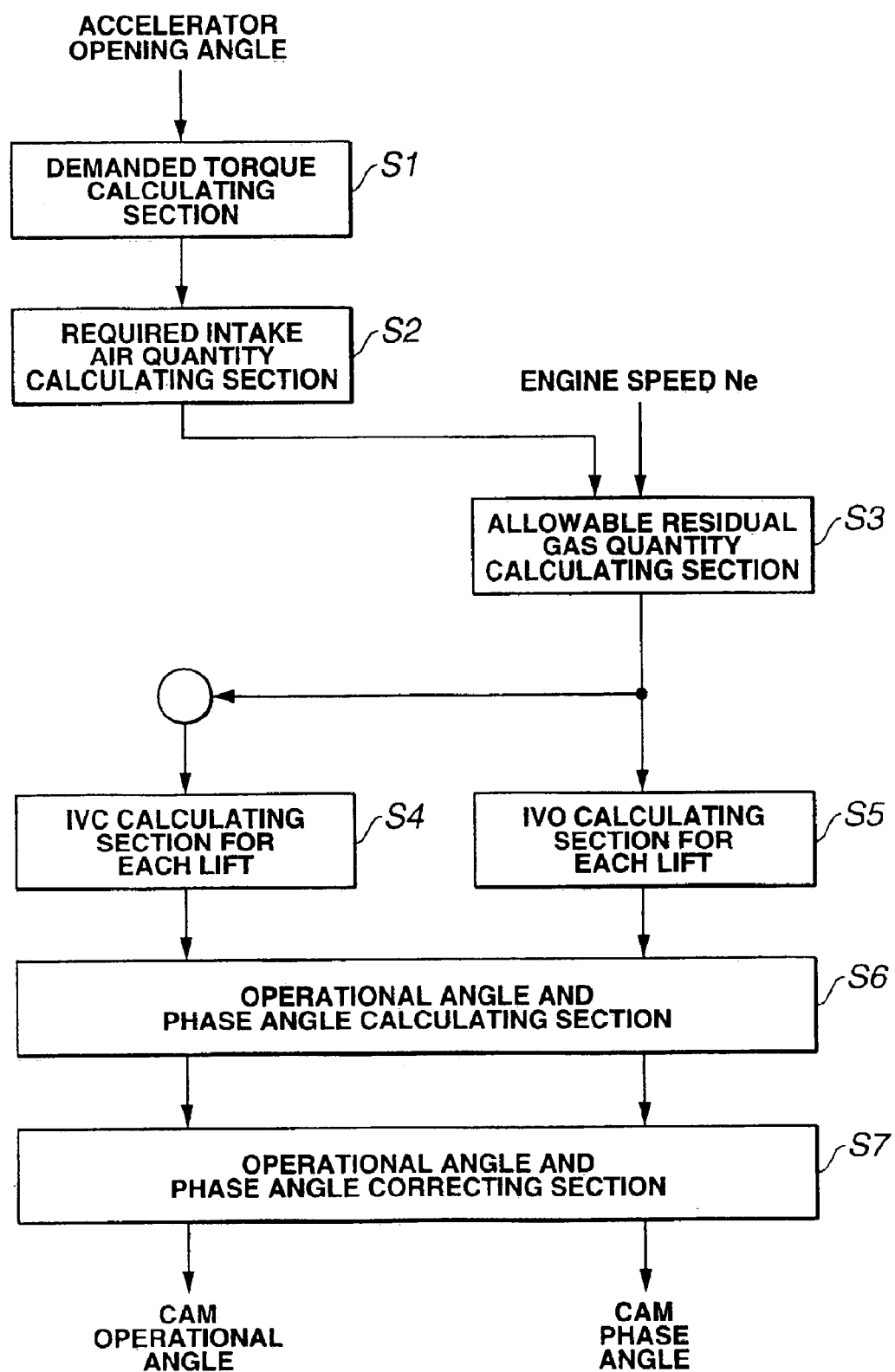

ACCELERATOR OPENING ANGLE — LARGE / SMALL

ENGINE SPEED (Ne) — HIGH / LOW

DEMANDED TORQUE — LARGE / SMALL

IVO — ADVANCE / RETARD

IVC — ADVANCE / RETARD

CAM OPERATIONAL ANGLE — LARGE / SMALL

CAM PHASE ANGLE — ADVANCE / RETARD
PHASE ANGLE LIMIT VALUE

TIME

TIME →

FIG.11A
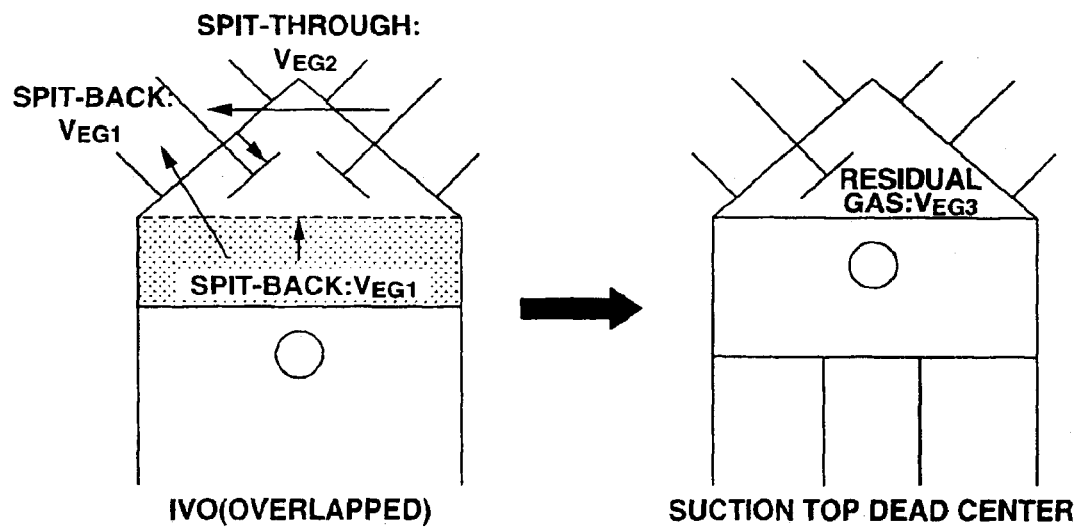
IVO(OVERLAPPED)
FIG.11B
SUCTION TOP DEAD CENTER
FIG.11C
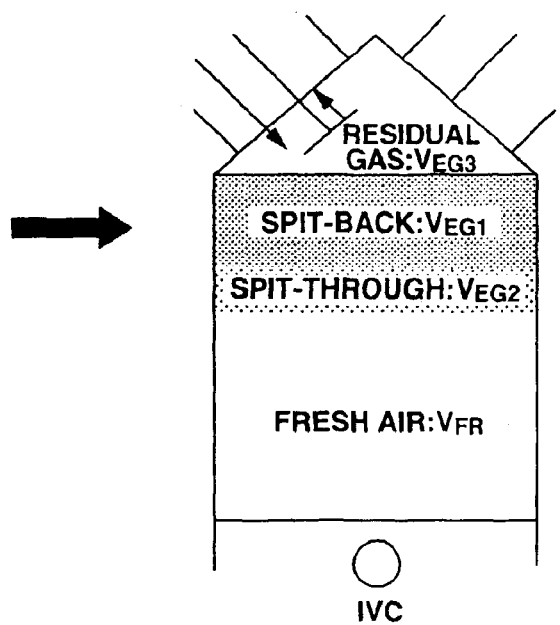
IVC

VARIABLE OPERATION INTAKE VALVE CONTROLLING APPARATUS AND METHOD FOR INTERNAL COMBUSTION ENGINE

BACKGROUND OF THE INVENTION

1. Field of the Invention

The present invention relates to variable operation intake valve controlling apparatus and method for an internal combustion engine in which a cam operational angle variable mechanism which is capable of controlling a cam operational angle (also called, a working angle) of the intake valve to continuously expand (widen) and shrink (narrow) the intake valve and a cam phase angle variable mechanism which is capable of displacing a lift center angle of the intake valve in either an advance angle direction or a retardation angle direction.

2. Description of the Related Art

A Japanese Patent Application First Publication No. 2001-280167 published on Oct. 10, 2001 exemplifies a previously proposed variable operation intake valve controlling apparatus.

In order to achieve a valve lift characteristic which is optimum for the present engine driving condition, a cam operational angle (which will be described later) of the intake valve of the engine is enabled to be controlled so as to be continuously expanded (widened) or shrunk (narrowed) or a phase variable mechanism a cam phase of a lift center angle of the intake valve is retarded or advanced are combined to form a variable operation engine valve mechanism. In addition, another Japanese Patent Application First Publication No. 2001-263104 published on Sep. 26, 2001 exemplifies another previously proposed variable operation engine valve controlling apparatus. In the latter Japanese Patent Application First Publication, a technique of controlling an intake valve closure timing and an exhaust valve closure timing so as to achieve a target value of a rate of a residual gas quantity within each cylinder using electromagnetic operation intake valve and electromagnetic operation exhaust valve.

SUMMARY OF THE INVENTION

In the structure in which both of the cam operational angle variable mechanism and the cam phase variable mechanism are incorporated, any one of valve lift characteristics is achieved by the operational angle controlled by the phase variable mechanism. However, for example, if the operational angle and the phase are individually and separately controlled using operational control maps to which the operational angles are allocated to the driving conditions (engine speed and engine load) and phase control maps to which the phases are allocated to the same driving condition, a tremendous amount of maps are required. In addition, in a case where a correction against a variation in a driving environment related to a combustion state such as an external temperature and an altitude is carried out from the operational angle and phase, it becomes extremely complicated for its optimization and actual process of calculation.

On the other hand, the technique disclosed in the above-described Japanese Patent Application First Publication No. 2001-263104 published on Sep. 26, 2001, the electromagnetic operation intake valve and exhaust valves are merely used so that a control problem described above which occur in the case where the operational angle variable mechanism and the phase variable mechanism are combined cannot be solved.

It is, therefore, an object of the present invention to provide variable operation intake valve controlling apparatus and method for an internal combustion engine in which optimum intake valve open timing (IVO) and intake valve closure timing (IVC) are determined from a required intake air quantity and an allowable residual gas quantity and the cam operational angle and the cam phase are determined from the optimum intake valve open and closure timings to control the operational angle variable mechanism and the phase variable mechanism without need of the tremendous amount of the control maps so that the control over the intake valve can be simplified.

According to a first aspect of the present invention, there is provided a variable operation intake valve controlling apparatus for an internal combustion engine, comprising: a cam operational angle variable mechanism that is capable of controlling an operational angle of the intake valve in such a manner that a range of the operational angle is continuously changed; a cam phase variable mechanism that is capable of continuously displacing a phase of a lift center angle of the intake valve and a controller for controlling an intake air quantity in accordance with valve timings of the intake valve determined according to the operational angle by means of the cam operational angle variable mechanism and the phase by means of the cam phase variable mechanism, the controller determining an allowable residual gas quantity from a required air quantity and an engine speed, the required air quantity being determined according to a manipulated variable of an accelerator, calculating optimum intake valve open and closure timings in such a manner that both of the required air quantity and the allowable residual gas quantity enter a cylinder of the engine, and determining the operational angle and the phase from the optimum intake valve open and closure timings.

According to a second aspect of the present invention, there is provided a variable operation intake valve controlling method for an internal combustion engine, the engine comprising: a cam operational angle variable mechanism that is capable of controlling an operational angle of the intake valve in such a manner that a range of the operational angle is continuously changed; and a cam phase variable mechanism which is capable of continuously displacing a phase of a lift center angle of the intake valve, the method comprising: controlling an intake air quantity in accordance with valve timings of the intake valve determined according to the operational angle by means of the cam operational angle variable mechanism and the phase by means of the cam phase variable mechanism; determining an allowable residual gas quantity from a required air quantity and an engine speed, the required air quantity being determined according to a manipulated variable of an accelerator; calculating optimum intake valve open and closure timings in such a manner that both of the required intake air quantity and the allowable residual gas quantity enter a cylinder of the engine; and determining the operational angle and the phase from the optimum intake valve open and closure timings.

According to a third aspect of the present invention, there is provided a variable operation intake valve controlling method for an internal combustion engine, the engine comprising: a cam operational angle variable mechanism that is capable of controlling an operational angle of the intake valve in such a manner that a range of the operational angle is continuously changed; and a cam phase variable mechanism which is capable of continuously displacing a phase of a lift center angle of the intake valve, the method comprising: calculating a demanded torque from a manipulated variable of an accelerator; calculating a required intake air quantity corresponding to the demanded torque; calculating an allowable residual gas quantity from the required air quantity and the engine speed; calculating the optimum valve open and valve closure timings (IVO and IVC) from the residual required air quantity and the allowable residual gas quantity; and calculating the operational angle and the phase from the optimum intake valve open and closure timings.

This summary of the invention does not necessarily describe all necessary features so that the invention may also be a sub-combination of these described features.

BRIEF DESCRIPTION OF THE DRAWINGS

FIG. 3 is a main operational flowchart for explaining a control over an operational angle and a cam phase (angle) during an engine acceleration.

FIGS. 11A, 11B, and 11C are explanatory views for explaining a gas stream within the cylinder from the intake valve open timing (IVO) to the intake valve closure timing (IVC).

DETAILED DESCRIPTION OF THE PREFERRED EMBODIMENT

Reference will hereinafter be made to the drawings in order to facilitate a better understanding of the present invention.

Figure 1:
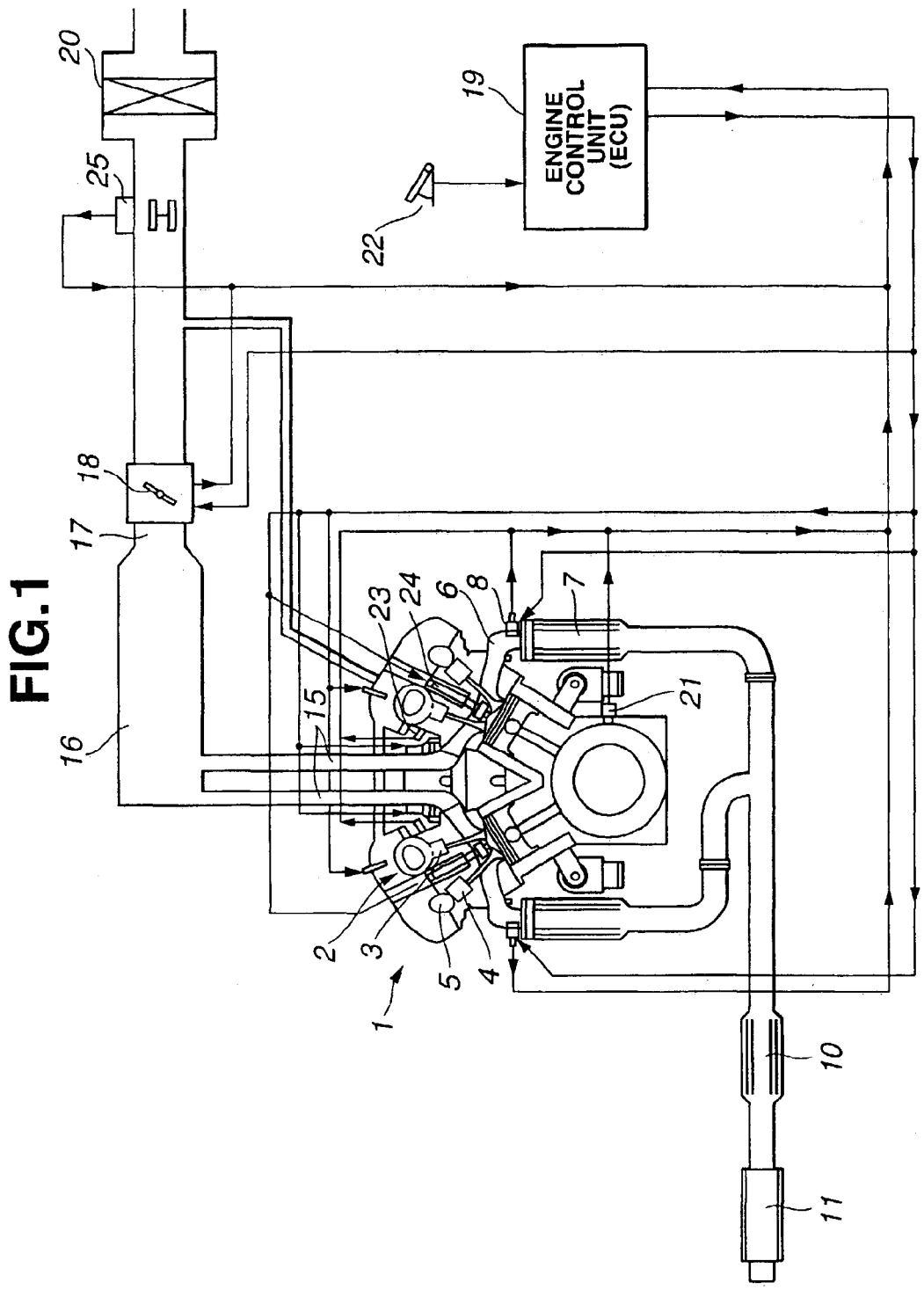
FIG. 1 is a gasoline spark-ignited internal combustion engine to which a variable operation intake valve controlling apparatus in a preferred embodiment according to the present invention is applicable.

FIG. 1 shows a V type six-cylinder gasoline engine 1 to which a preferred embodiment of a variable operation intake valve controlling apparatus according to the present invention is applicable.

Variable operation engine valve mechanisms 2 as will be described later are disposed on intake valves 3, 3, - - - of left and right cylinder banks, respectively. The variable operation engine valve mechanism 2 for exhaust valves are of direct operated type which drives exhaust valves 4 by means of an exhaust camshaft 5. A valve lift characteristic is always constant. Exhaust manifolds 6 disposed on the left and right banks are connected to catalyst converters 7. Air-fuel ratio sensors 8 are disposed at upper streams of these catalyst converters 7 to detect an exhaust air-fuel ratio. A second catalyst converter 10 and muffler 11 are disposed at a further downstream side of the exhaust passages 9. The exhaust passages 9, 9 are joined at the downstream side of catalyst converter 7. Branch passages 15 are connected to intake ports of the respective cylinders. Each upper stream end of this six branch passages 15 is connected to a collector 16. One end of collector 16 is connected to an intake air inlet passage 17. An electronically controlled throttle valve 18 used to generate a negative pressure is disposed at intake air inlet passage 17. Electronically controlled throttle valve 18 is provided with an actuator constituted by an electric motor and its opening angle of throttle valve 18 is controlled in response to a control signal supplied from an engine control unit (ECU) 19 (hereinafter, also called a controller). It is noted that a sensor (not shown) to detect an actual opening angle of throttle valve 18 is integrated with throttle valve 18. On the basis of the detected signal of the opening angle sensor attached to throttle valve 18, the opening angle of throttle valve 18 is controlled to become a target opening angle in a closed loop. An airflow meter 25 to detect an intake air flow quantity is disposed at an upper stream of throttle valve 18 to detect an intake air flow quantity and an air cleaner 20 is disposed on an upstream side of airflow meter 25. In addition, in order to detect an engine speed (Ne) and a reference crank angular position, a crank angle sensor 21 to detect a revolution of an engine crankshaft is disposed. Furthermore, an accelerator opening angle sensor 22 is disposed to detect an accelerator opening angle (a depression depth of an accelerator pedal by a vehicle driver and, in a broad sense of the term, a manipulated variable of an accelerator). These detection signals are inputted to engine control unit (ECU) 19 (hereinafter, also called a controller). Engine control unit 19 controls a fuel injection quantity and a fuel injection timing through a fuel injection valve (fuel injector) 23, an ignition timing by means of a spark plug 24, a valve lift characteristic through variable operation mechanisms 2, and the opening angle of throttle valve 18. Engine control unit (ECU) 19 includes a microcomputer having a CPU (Central Processing Unit), a ROM (Read Only Memory), a RAM (Random Access Memory), an Input Port, an Output Port, a common bus, and so forth.

Next, a structure of each variable operation engine valve mechanism 2 for intake valve 3 will be described below with reference to FIG. 2. it is noted that variable operation valve mechanism 2 is a combination of a lift-and-operational-angle variable mechanism 51 which varies lift and operational angle of intake valve 3 and a phase variable mechanism 71 which displaces (angularly advances or retards) a phase of a center angle of the lift thereof.

First, lift-and-operational-angle variable mechanism 51 will be described. This lift-and-operational-angle variable mechanism 51 is exemplified by Japanese Patent Application First Publications No. 2001-280167 published on Oct. 10, 2001 and No. 2002-089303 published on Mar. 27, 2002.

Lift-and-operational-angle variable mechanism 51 includes: intake valve 3 slidably disposed on a cylinder head; a drive axle 52 rotatably supported on a cam bracket (not shown) located at an upper part of the cylinder head; an eccentric cam 53 fixed to drive axle 52 by means of a press;

a control axle 62 rotatably supported at an upper position of drive axle 52 by the same cam bracket as described above and juxtaposed to drive axle 52; a rocker arm 56 supported on an eccentric cam portion 68 of control axle 62 so as to enable a pivotal movement with respect to control axle 62; and a cam 59 which is brought in contact with a tappet 60 disposed on an upper end of each intake valve 3. Eccentric cam 53 is linked to rocker arm 56 via a link arm 54. Rocker arm 56 and cam 59 are linked together via a link member 58. Drive axle 52 is driven by means of the engine crankshaft via a timing chain or timing belt as will be described later.

Eccentric cam 53 has a circular outer peripheral surface, a center of the outer peripheral surface being offset by a predetermined quantity from an axial center of drive axle 52 and an ring-shaped portion of link arm 54 being rotatably fitted to the outer peripheral surface of eccentric cam 53.

Rocker arm 56 has a substantially center portion supported by eccentric cam portion 68 so as to be enabled to be pivoted about eccentric cam portion 68, one end portion thereof being associated with an arm portion of link arm 54 via a linkage pin 55 and the other end portion thereof being associated with an upper end of link member 58. Eccentric cam portion 68 is eccentric from an axial center of control axle 62. Hence, a pivotal center of rocker arm 56 is varied in accordance with an angular position of control axle 62. Cam 59 is rotatably fitted into an outer periphery of drive axle 52 and rotatably supported on drive axle 52. A lower end of link member 58 is associated with a side-extended end portion of cam 59. A base circle surface of an arc shape concentric to drive axle 52 and a cam surface extended with a predetermined curved line drawn from the base circle surface are continuously formed on a lower surface of cam 59. The base circle surface and cam surface thereof are brought in close contact with an upper surface of tappet 60 in accordance with a pivoted position of cam 59. That is to say, the base circle surface corresponds to an interval in which a lift is zeroed as a base circle interval. When cam 59 is pivoted so that the cam surface is brought in close contact with tappet 60, cam 59 is gradually lifted. A slight ramp interval is provided between the base circle interval and lift interval.

Figure 2:
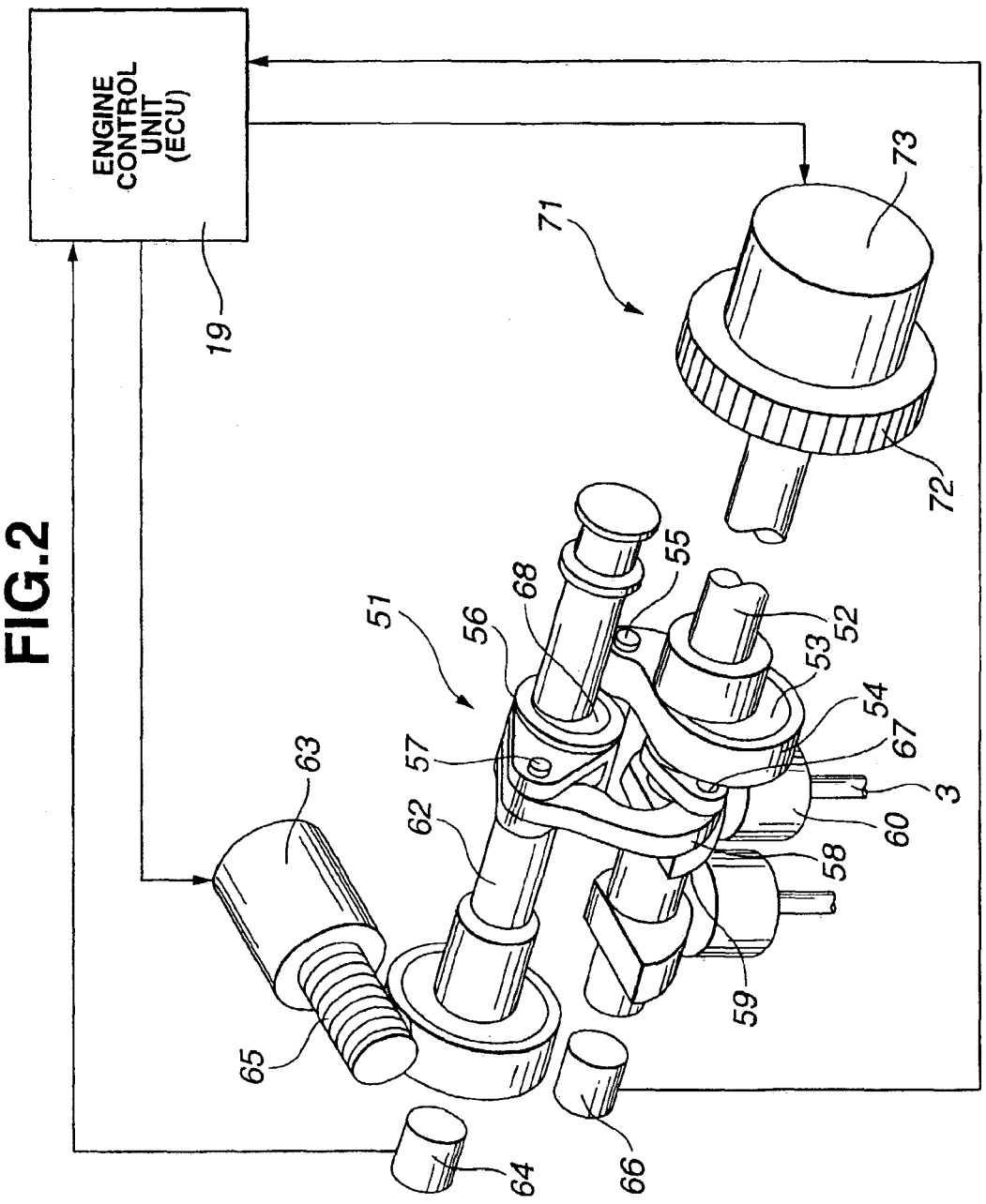
FIG. 2 is perspective view representing a variable operation mechanism for an intake valve used in the variable operation intake valve controlling apparatus in the preferred embodiment shown in FIG. 1.
Figure 4A:
FIGS. 4A, 4B, 4C, 4D, 4E, 4F, 4G, 4H, and 4I show integrally a timing chart for explaining variations of each engine parameter during the engine acceleration in the case of a result of a control routine shown in FIG. 3.
Figure 4B:
Figure 4C:
Figure 4D:
Figure 4E:
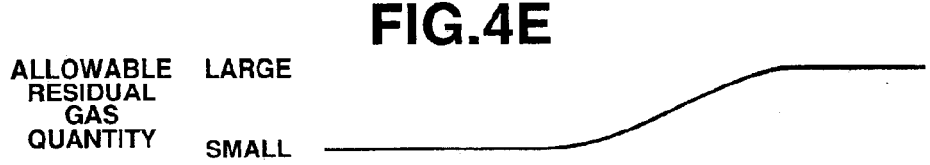
Figure 4F:
Figure 4G:
Figure 4H:
Figure 4I:

Control axle 62 is pivoted within a predetermined angular range by means of a lift-and-operational-angle control purpose actuator 63 provided on one end as shown in FIG. 2. Lift-and-operational-angle control purpose actuator 63 includes a servo motor to drive control axle 62 via, for example, worm gear 65 and is controlled in response to a control signal from engine control unit (ECU) 19. It is noted that a rotational (pivotal) angle of drive axle 62 is detected by means of a control axle sensor 64.

An operation of above-described lift-and-operational-angle variable mechanism 51 will be described below. When drive axle 52 is rotated, link arm 54 is moved in a vertical direction due to a cam action of eccentric cam 53 so that rocker arm 56 is pivoted (swung) about control axle 56. The swing (pivotal motion) of rocker arm 56 is transmitted to cam 59 via link member 58 so that cam is accordingly swung (pivoted) about drive axle 52. A cam action of cam 59 presses tappet 60 for intake valve 3 to be lifted. Then, when an angle of control axle 62 is varied via lift-operational-angle control purpose actuator 63, an initial position of rocker arm 56 is varied and an initial swing (pivotal) position of cam 59 is accordingly varied.

For example, suppose that eccentric cam portion 68 is placed at an upper position with respect to control axle 62. At this time, whole rocker arm 56 is placed at the upper position and an end portion of cam 59 placed toward linkage pin 67 is relatively lifted toward an upward direction. In details, the initial position of swing, cam 59 is tilted toward a direction in which the cam surface thereof becomes away from tappet 60. Hence, when cam 59 is swung (pivoted) along with the pivotal motion (swing) of drive axle 52, the base circle surface is continued to be contacted with tappet 60 for a relatively long time but an interval in which cam surface is contacted with tappet 60 becomes short. Hence, the lift (vertical displacement) becomes as a whole small and an angular range from a time at which intake valve 3 is open to a time at which intake valve 3 is closed, viz., the operational angle is shrunk (narrowed).

On the contrary, suppose that eccentric cam 68 is placed at a lower position with respect to control axle 62 as shown in FIG. 2. At this time, rocker arm 56 is, as a whole, placed at the lower position so that the end portion of cam 59 placed toward linkage pin 67 is pressed relatively in the downward direction. In details, the initial position of cam 59 is tilted in a direction approaching to tappet 60. Hence, when cam 59 is swung along with the revolution of drive axle 52, a position of cam 59 which is contacted with tappet 50 is immediately transferred from the base circle surface to the cam surface. Consequently, the lift of intake valve 3 is, as a whole, larger and its operational angle (working angle) becomes expanded (widened).

Since the initial position of eccentric cam portion 68 can be varied continuously, the valve lift characteristic is continuously varied. In other words, both of the lift and operational angle can continuously be expanded (widened) and shrunk (narrowed) at the same time. Although depending upon a layout of the mechanism, both of the open timing and closure timing of intake valve 3 are substantially symmetrically varied along with a variation in the magnitudes of the lift and the operational angle.

Next, phase variable mechanism 71, as shown in FIG. 2, includes: a sprocket 72 disposed on a front end of drive axle 52; and a phase control purpose actuator 73 relatively rotating sprocket 72 and drive axle 52 within a predetermined angular range. Sprocket 72 is interlocked with engine crankshaft via a timing chain or timing belt (not shown). Phase control purpose actuator 73 is constituted by, for example, a rotary actuator of electromagnetic type or hydraulic type is controlled in response to a control signal from controller 19. Phase control purpose actuator 73 is acted upon to rotate sprocket 72 and drive axle 52 relatively to each other so that a lift center angle in the valve lift is advanced or retarded. In other words, without change in the curved line itself of the valve lift characteristic, the whole valve characteristic. curve is, as a whole, displaced in the advance angle direction or the retardation angle direction.

In addition, this variation can continuously be obtained. The control state of phase variable mechanism 71 is detected by drive axle sensor 6 which responds to the pivotal (rotational) position of drive axle 52.

As described above, the variable operation mechanism 2 includes lift-and-operational-angle mechanism 51 and phase variable mechanism 71. Both combination of the respective controls and valve characteristics, especially, intake valve open timing (IVO) and intake valve closure timing (IVC) can largely and continuously be varied. Then, without resort to throttle valve 18, a variable control over intake valve 3 can achieve the intake air quantity control.

In this embodiment, throttle valve 18 does not function of controlling the intake air quantity but is present for developing an appropriate negative pressure in intake passage.

The opening angle of throttle valve 18 is generally maintained constant so that a pressure within collector 16 indicates a negative pressure (for example, −50 mmHg) at a minimum required as a predetermined negative pressure, viz., the negative pressure source. A final control of intake air quantity is carried out by means of variable operation engine variable mechanism 2. As described above, the engine is substantially in a throttle-loss drive and a pumping loss can remarkably be reduced. Since a negative pressure required at minimum is secured with collector 16, various systems utilizing negative pressure such as a circulation of blow-by gas required for practical engine can be applied without a remarkable modification. It is noted that the present invention is applicable to the internal combustion engine in which no throttle valve is provided.

Next, a specific control procedure which controls lift-and-operational-angle variable mechanism 51 and phase variable mechanism 71 in accordance with the engine driving condition will be described below.

Figure 10:
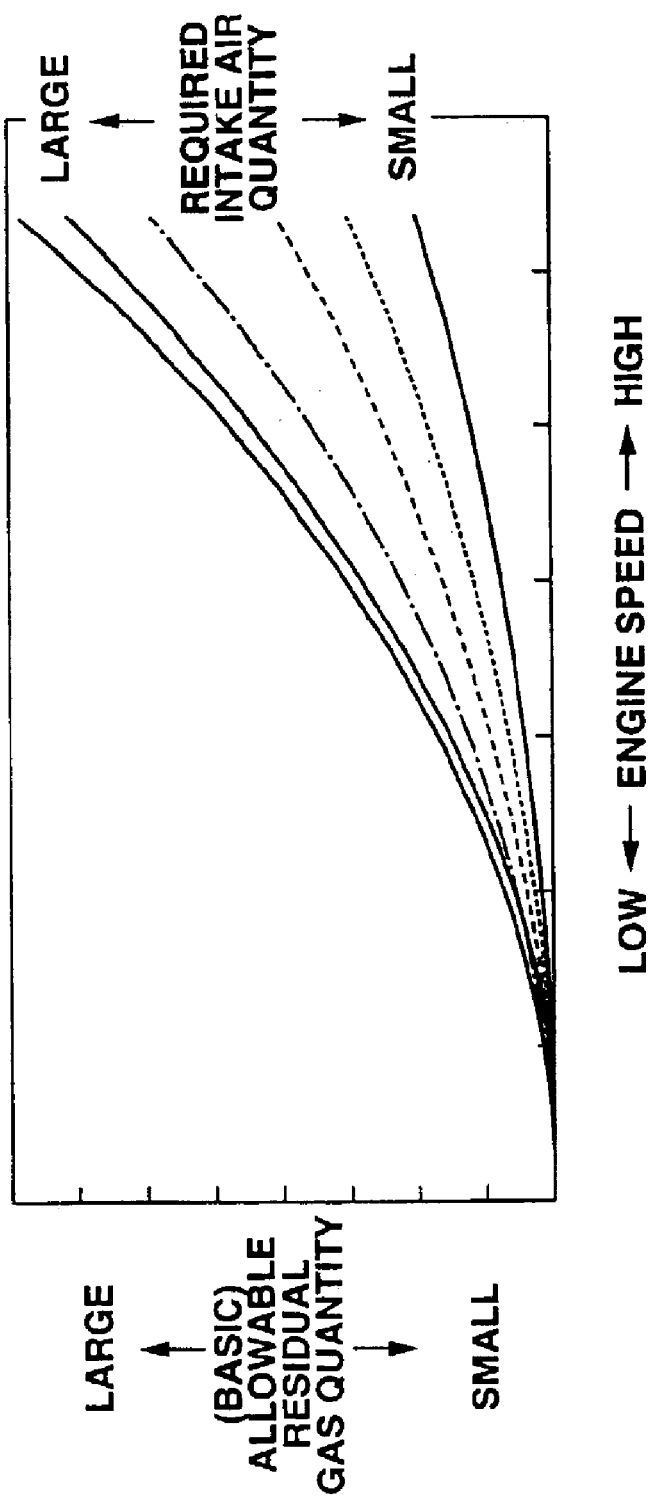
FIG. 10 is a characteristic graph representing a relationship from among a required air quantity, an engine speed, and allowable residual gas quantity.

FIG. 3 shows a main flowchart representing a whole stream of control to be executed in the variable operation intake valve controlling apparatus. At a step S1, controller 19 (demanded torque calculating section) calculates a required torque (or called, a demanded torque) from the accelerator manipulated variable (but herein called, the opening angle of the accelerator) detected by accelerator opening angle sensor 22. At a step S2, controller (ECU) 19 (required intake air quantity calculating section) calculates a required intake air quantity corresponding to the required torque (demanded torque) derived at step S1. At a step S3, controller 19 (an allowable residual gas quantity calculating section) calculates an allowable residual gas quantity according to the required intake air quantity calculated at step S2 and from the present engine speed (Ne) by referring to a map based on a relationship from among the required intake air quantity, the engine speed (Ne), and allowable residual gas quantity as shown in FIG. 10. From the required intake air quantity and allowable residual gas quantity, optimum IVO (intake valve open timing) and IVC (intake valve closure timing) are calculated at steps S4 and S5.

At a step S6, controller 19 (operational angle and phase angle calculating section) calculates the operational angle and phase according to the optimum IVO and IVC derived at steps S4 and S5. In details, controller 19 derives an angular range from an angle at which intake valve is open (IVO) to an angle at which intake valve 3 is closed (IVC) as the operational angle and derives the phase (or phase angle) as a center point between the IVO and IVC. It is noted that, the phase between IVO and IVC of the lift center angle is represented by a crank angle measured in an advance angle direction from a bottom dead center and this is called a phase angle.

At a step S7, controller 19 (operational angle and phase angle correcting section) determines if these operational angle and phase fall in respective ranges of achievable values for the lift-and-operational-angle variable mechanism 51 and phase variable mechanism 71. If these optimum operational angle and the phase are in excess of their respective limit values (maximum values thereof) (operational angle limit value and phase limit value), a correction for the IVO and IVC as will be described later is carried out. Then, the finally determined operational angle and phase are given as target values for lift-and-operational-angle variable mechanism 51 and phase variable member 71. It is noted that a cam operational angle variable mechanism defined in the claims correspond to lift-and-operational angle variable mechanism 51.

FIGS. 4A through 4I show integrally a timing chart representing variation situations of operational angle target value and phase angle target value when the optimum operational angle and phase are within the operational angle limit value of lift-and-operational-angle variable mechanism 51 and phase limit value of phase variable mechanism 71. This example of FIGS. 4A through 4I shows variations in parameters (accelerator opening angle, engine speed (Ne), required fresh air quantity, allowable residual gas quantity, IVO, IVC, cam operational angle, and cam phase angle) when the accelerator opening angle is increased, viz., during an engine acceleration, the required torque and required intake air quantity are increased together with the accelerator opening angle. Then, the intake valve open timing (IVO) is slightly advanced so that a valve overlap is expanded and IVC is largely retarded to approach to the bottom dead center. Consequently, a substantial suction stroke of the engine is increased. Together with the variations in IVO and IVC, the operational angle is increased and the phase angle is decreased, viz., displaced in the retardation angle direction.

Figure 5:
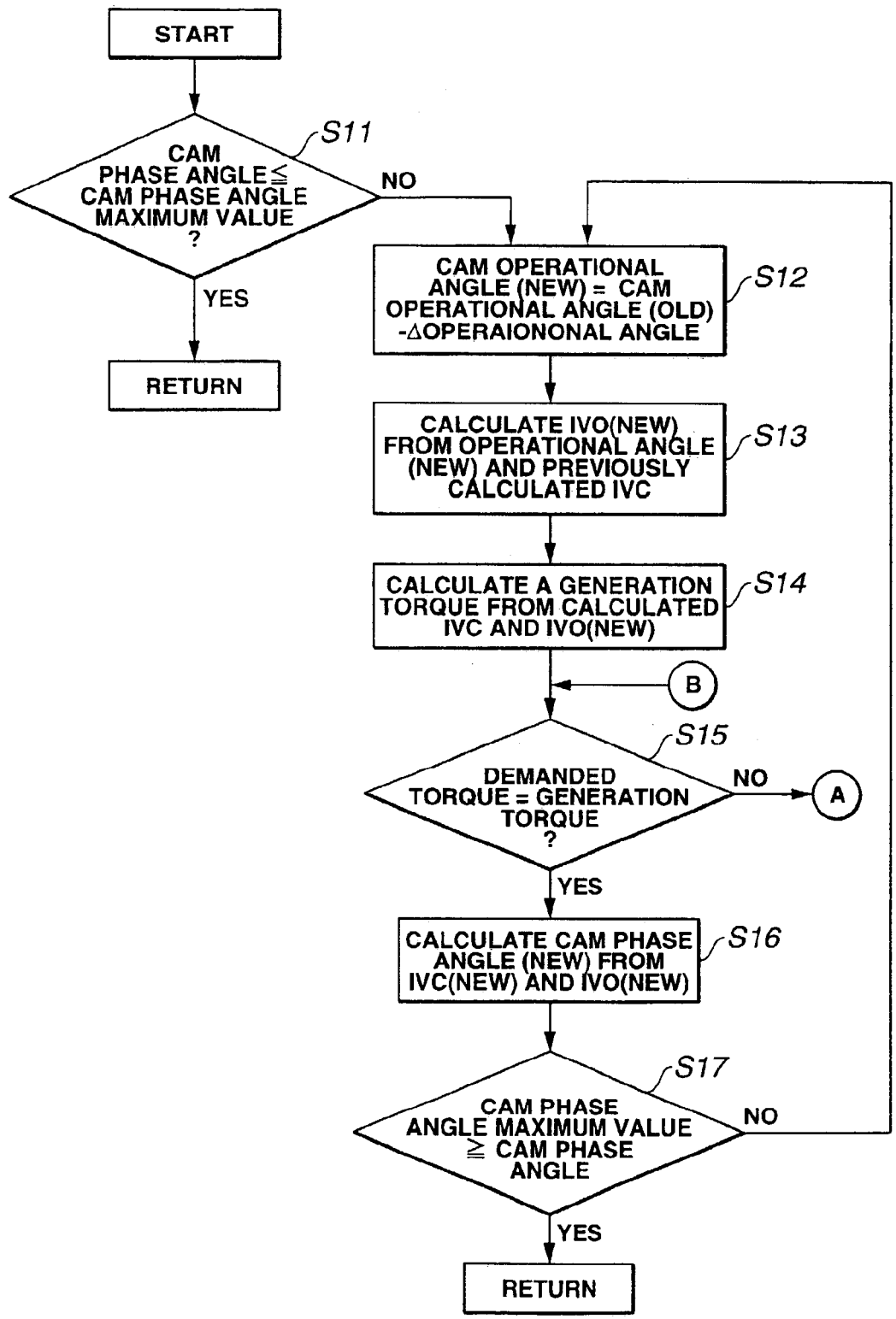
FIG. 5 is an operational flowchart in a case where a correction control in a case where the cam phase angle is limited to be within a phase angle maximum value.
Figure 6:
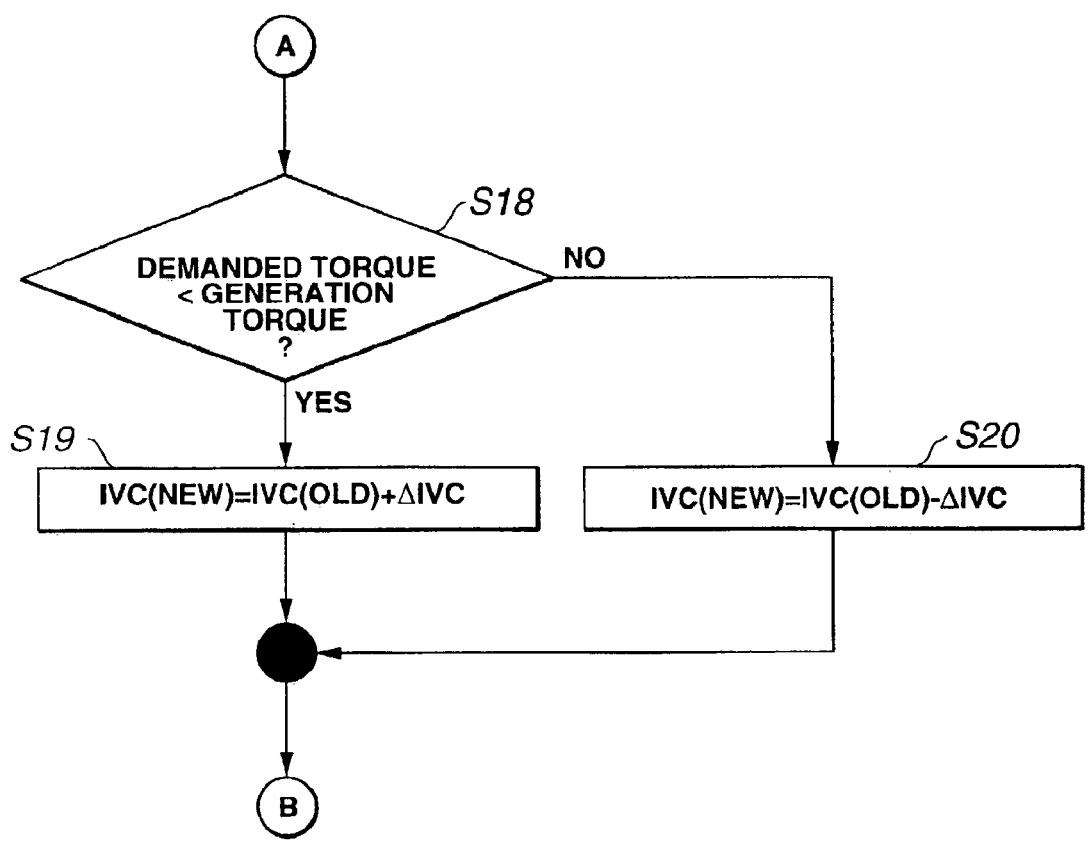
FIG. 6 is a branched flowchart part of the routine shown in FIG. 5.
Figure 7A:
FIGS. 7A, 7B, 7C, 7D, 7E, 7F, and 7G are integrally a timing chart for explaining variations of each engine parameter in the case where the phase angle is limited as shown in FIGS. 5 and 6.
Figure 7B:
Figure 7C:
Figure 7D:
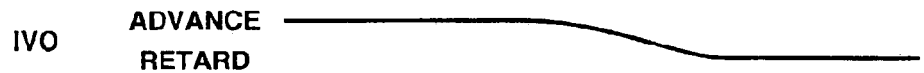
Figure 7E:
Figure 7F:
Figure 7G:
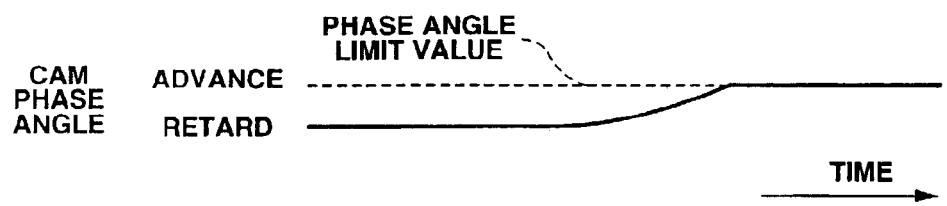

On the other hand, if phase variable mechanism 71 cannot be displaced to the cam phase determined as the optimum value, the operational angle and phase angle correcting section at step S7 described above corrects IVC and IVO as will be described later so that a fuel consumption (fuel economy) becomes optimum within the limited phase range. FIGS. 5 and 6 integrally show a flowchart representing a processing flow of a limitation, especially, on the phase angle. In details, at a step S11, controller 19 determines if the calculated phase angle is equal to or larger than a phase limitation maximum value (cam phase angle maximum value) of phase variable mechanism 71. If the calculated phase angle is larger than (in excess of) the phase angle maximum value (No), the routine goes to a step S12. If Yes at step S11, the routine is returned. If phase angle>phase angle maximum value (No) at step S11, a slight angular value Δ operational angle is subtracted from the previously calculated operational angle (old) to derive a new operational angle (new) (Δ denotes a predetermined minute quantity). At the next step S13, controller 19 derives a new IVO from the calculated IVC at step S4 and the operational angle after the correction thereof. At a step S14, a generation torque is calculated from IVO (new) and the IVC. At a step S15, controller 19 determines if the demanded torque is coincident with (substantially equal to) the demanded torque.

In a case where the modifications of IVO and operational angle causes the generation of torque to be varied, the routine goes from step S15 to step S18 (FIG. 6) to determine if the generation torque becomes larger than the demanded torque. If demanded torque<generation torque (Yes) at step S18, the routine goes to a step S19. If demanded torque≧generation torque (No) at step S18 (No) at step S18, the routine goes to a step S20. At step S19, the slight angular value (Δ IVC) to correct the intake valve closure timing (IVC) in the advance angle direction is added to the previous IVC to derive a new IVC. On the contrary, if demanded torque<generation torque at step S18, the generation torque is decreased (No at step S18), the processes from step S18 to step S20 are repeated until the demanded torque is substantially equal to the generation torque. If demanded torque is substantially equal to generation torque at step S15 (Yes), the routine goes to step S16 to calculate cam phase angle (New) from IVC (New) to IVO (New). If not reached to phase angle maximum value, the routine goes to step S12. The above-described processes are repeated. It is noted that, when step S14 is carried out in the repetitive loop, the IVC at step S14 is IVC(new). Consequently, the operational angle at which the phase angle reaches to the phase angle maximum value is determined. The intake valve closure timing IVC and intake valve open timing IVO are determined so that the operational angle reaches to phase angle maximum value. The intake valve closure timing (IVC) and, furthermore, the intake valve open timing (IVO) are determined so that the generation torque substantially equal to the demanded torque.

FIGS. 7A through 7G are integrally a timing chart for explaining variation situations of the operational angle target value and phase angle target value in a case where the limitation is placed on such a phase angle maximum value as described above with reference to FIGS. 5 and 6. This example of FIGS. 7A through 7G shows the variations of parameters (accelerator opening angle, engine speed (Ne), demanded torque, IVO, IVC, cam operational angle, and cam phase angle) when the engine is decelerated with the accelerator opening angle decreased. While the operational (or working as described above) angle is shrunk (narrowed), the cam phase is tried to be advanced. At a time point at which the phase angle reaches mechanically to the cam phase maximum value, the phase cannot be advanced any more. Hence, the IVC and IVO are corrected to obtain the generation torque with the phase angle maintained at the maximum. It is noted that, since the residual gas quantity is maintained at its maximum, the fuel consumption indicates optimum within the maximum value of the cam phase.

Figure 8:
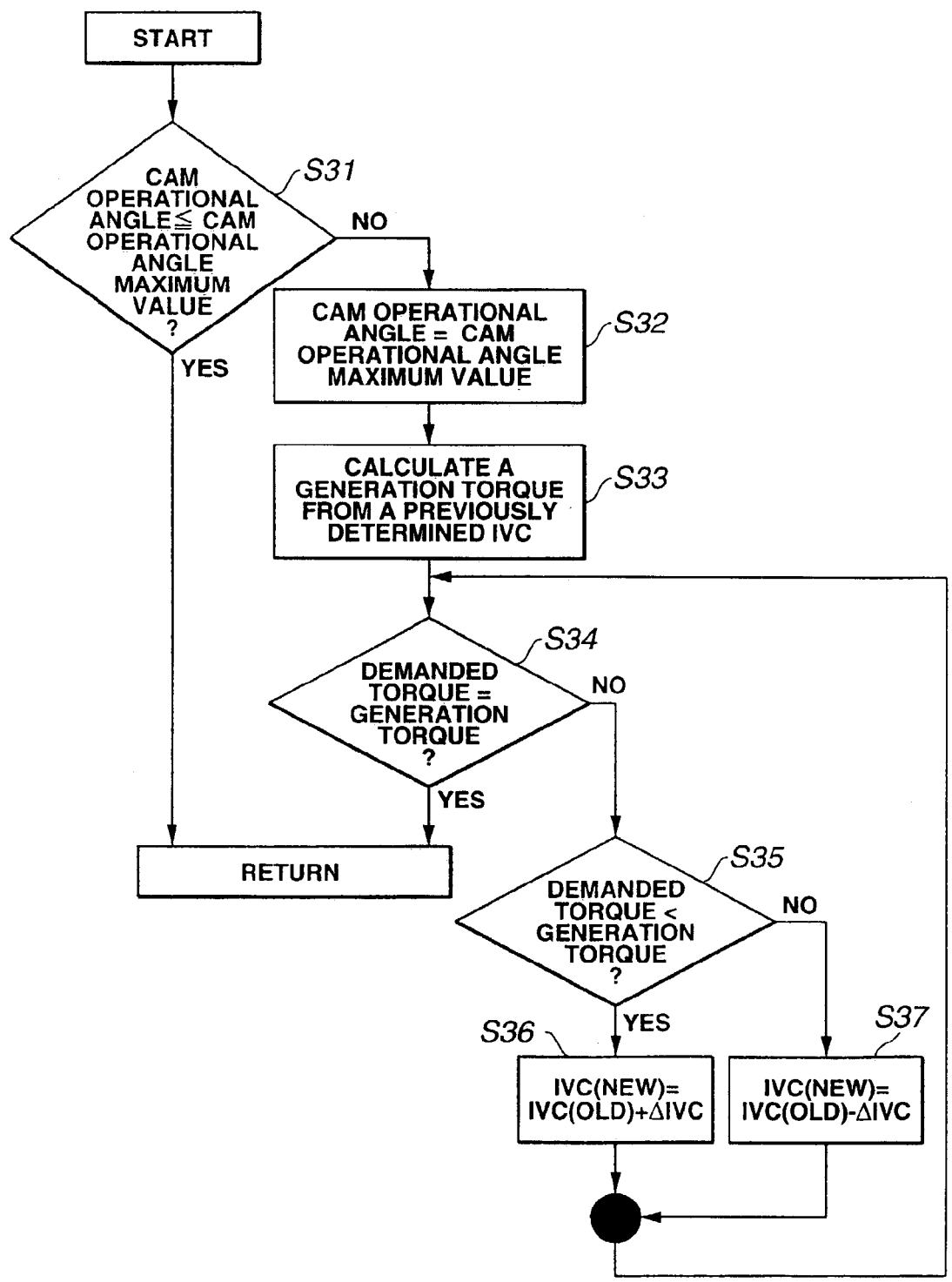
FIG. 8 is an operational flowchart representing the corrective control in a case where the operational angle is limited within an operational angle maximum value.
Figure 9A:
FIGS. 9A, 9B, 9C, 9D, 9E, 9F, and 9G are integrally a timing chart for explaining the variations in the parameter when the cam operational angle is limited as shown in FIG. 8.
Figure 9B:
Figure 9C:
Figure 9D:
Figure 9E:
Figure 9F:
Figure 9G:

Next, FIG. 8 shows an operational flowchart in a case where the operational-angle determined as the optimum value exceeds a mechanical limitation value of lift-and-operational angle variable mechanism 51. At step S31, controller 19 determines whether the calculated operational angle is equal to or lower than the operational angle maximum value. If operational angle>operational angle maximum value (No) at step S31, the routine goes to a step S32. At step S32, controller 19 fixes the operational angle to the operational angle maximum value. At the next step S33, the controller 19 derives the generation torque from the calculated IVC at step S4. Then, controller 19 determines whether the generation torque is coincident with (substantially equal to) the demanded torque. If not coincident with the demanded torque at step S34 (No), the routine goes to a step S35. AT step S35, controller 19 determines whether the generation torque is increased or decreased more than the demanded torque. If it is increased, controller 19 corrects the IVC so as to be added by the slight angle value to the previous IVC. to derive the new IVC which is advanced by ΔIVC. On the contrary, if the generation torque is decreased more than the demanded torque, the routine goes to a step S37 in which controller 19 corrects the previous IVC (old) to subtract it from the slight angular value (ΔIVC) to derive the new IVC. Such processes as steps S35 to S37 are repeated until the generation torque is made coincident with (substantially equal to) the demanded torque. Consequently, together with the operational angle maintained at maximum, controller 19 determines intake valve closure and open timings (IVC and IVO) so that the generation torque is made coincident with (substantially equal to) the demanded torque while the operational angle is maintained at the maximum.

FIGS. 9A through 9G show integrally a timing chart representing the variation situations such as the operational angle target value and phase angle target value when the operational angle value is limited to the operational angle maximum value as shown in the flowchart of FIG. 8. The example of FIGS. 9A through 9G shows the variations of the above-described parameters (accelerator opening angle, engine speed (Ne), demanded torque, IVO, IVC, cam operational angle, and cam phase angle) when the accelerator opening angle is increased and the engine is accelerated in the case of the fixed maximum operational angle value (refer to FIG. 9F).

In this example, while the operational angle is increased, the phase is tried to be retarded. However, at a time point at which the operational angle has reached to the mechanical operational angle limit value achievable by lift-and-operational angle variable mechanism 51 (operational angle maximum value), the operational angle cannot be expanded any more. Hence, with the operational angle maintained at the maximum value, intake valve open timing and closure timings IVO and IVC are corrected so that the demanded torque can be obtained. It is noted that, since the residual gas quantity is maintained at maximum, the fuel economy can be optimized within a range of the limited operational angle.

It is noted that, in the above-described embodiment of the variable operation intake valve controlling apparatus according to the present invention, the lift-and-operational-angle variable mechanism 51 is used in which both of the lift and the operational angle are simultaneously varied as an operational angle variable mechanism, a mechanism in which the operational angle is varied with a maximum lift maintained constant may be utilized.

The variable operation intake valve controlling apparatus and method for an internal combination engine according to the present invention uses lift-and-operational-angle variable mechanism 51 which is capable of continuously changing the range of the operational angle of the intake valve and phase variable mechanism 71 which is capable of continuously displacing the phase of the lift center of the intake valve and determines the intake valve timings (IVO and IVC) according to the operational (working) angle and the phase angle, this valve timings controlling the intake air quantity. Especially, according to the present invention, the required (intake) air quantity is derived from an accelerator opening angle. The relationship from among the required air quantity, the engine speed, and the allowable residual gas quantity are shown in FIG. 10. Hence, for example, if this relationship is mapped and this map is referred to, the present allowable residual gas quantity is derived. It is noted that, for example, when an altitude and/or external temperature are varied so that the allowable residual gas quantity is reduced, it is easily possible to correct the present allowable residual gas quantity by multiplying the basic allowable residual gas quantity by its reduction rate. On the other hand, a gas flow within a cylinder from intake valve open timing (IVO) to intake valve closure timing (IVC) is changed as shown in FIGS. 11A, 11B, and 11C. FIG. 11A schematically shows a cylinder state under the intake valve open timing (IVO) state. FIG. 11B schematically shows a cylinder state under a piston's suction stroke top dead center, and FIG. 11C schematically shows a still another cylinder state under the intake valve closure timing (IVC). In FIG. 11A, $V_{EG1}$ denotes a spit-back quantity of the allowable residual gas quantity from the cylinder, $V_{EG2}$ denotes a spit-through quantity by which a part of allowable residual gas quantity is once blown through the cylinder from the exhaust port to the intake port, $V_{EG3}$ denotes a residual quantity within the cylinder from among the allowable residual gas quantity, $V_{EG}$ denotes the allowable residual gas quantity (in order words, $V_{EG}=V_{EG1}+V_{EG1}+V_{EG3}$), $V_{FR}$ denotes a fresh air quantity, viz., required air quantity. As shown in FIGS. 11A through 11C, IVO serves to determine spit-back quantity $V_{EG1}$ and spit-through quantity $V_{EG2}$. In addition, since these ($V_{EG1}$ and $V_{EG2}$) are returned finally back within the cylinder from the intake port, the IVC serves to determine a total gas quantity ($V_{EG}+V_{FR}$). Hence, according to the required air quantity ($V_{FR}$) and the allowable residual gas quantity (($V_{EG}$)), the required intake valve open and closure timings IVO and IVC are determined. Then, the operational angle is determined as an angular range between the intake valve open and closure timings (IVO and IVC) and the phase is determined as, for example, a center of the intake valve open timings IVO through IVC in a unit of angle. Along with the determined operational (working) angle and, the cam phase, the lift-and-operational angle variable mechanism 71 and the phase variable mechanism 51 are driven. It is noted that the required intake air quantity is deemed to have the same meaning of the required air quantity.

The entire contents of a Japanese Patent Application No. 2002-236738 (filed in Japan on Aug. 15, 2002) are herein incorporated by reference. The scope of the invention is defined with reference to the following claims.

What is claimed is:

1. A variable operation intake valve controlling apparatus for an internal combustion engine, comprising:
   a cam operational angle variable mechanism that is capable of controlling an operational angle of the intake valve in such a manner that a range of the operational angle is continuously changed;
   a cam phase variable mechanism that is capable of continuously displacing a phase of a lift center angle of the intake valve; and
   a controller for controlling an intake air quantity in accordance with valve timings of the intake valve determined according to the operational angle by means of the cam operational angle variable mechanism and the phase by means of the cam phase variable mechanism, the controller determining an allowable residual gas quantity from a required air quantity and an engine speed, the required air quantity being determined according to a manipulated variable of an accelerator, calculating optimum intake valve open and closure timings in such a manner that both of the required air quantity and the allowable residual gas quantity enter a cylinder of the engine, and determining the operational angle and the phase from the optimum intake valve open and closure timings.

2. A variable operation intake valve controlling apparatus for an internal combustion engine as claimed in claim 1, wherein, when the operational angle determined from the optimum intake valve open and closure timings is in excess of an operational angle limit value of the operational angle variable mechanism, the controller corrects the phase in such a manner that a demanded torque is developed under the operational angle limit value.

3. A variable operation intake valve controlling apparatus for an internal combustion engine as claimed in claim 1, wherein, when the phase determined from the optimum intake valve open and closure timings is in excess of a phase angle limit value of the phase variable mechanism, the controller corrects the operational in such a manner that a demanded torque is developed under the phase angle limit value.

4. A variable operation intake valve controlling apparatus for an internal combustion engine as claimed in claim 1, wherein the controller comprises: a demanded torque calculating section that calculates a demanded torque from the manipulated variable of the accelerator; a required air quantity calculating section that calculates the required air quantity corresponding to the demanded torque calculated by the demanded torque calculating section; an allowable residual gas quantity calculating section that calculates the allowable residual gas quantity from the required intake air quantity and the engine speed; a valve timing calculating section that calculates the optimum valve open and valve closure timings (IVO and IVC) from the residual required air quantity and the allowable residual gas quantity; and an operational angle and phase calculating section that calculates the operational angle and the phase from the optimum intake valve open and closure timings.

5. A variable operation intake valve controlling apparatus for an internal combustion engine as claimed in claim 4, wherein the operational angle and phase calculating section calculates the operational angle and the phase from a crank angle at the optimum intake valve open timing (IVO) to another crank angle at the optimum intake valve closure timing (IVC).

6. A variable operation intake valve controlling apparatus for an internal combustion engine as claimed in claim 4, wherein the operational angle and phase calculating section calculates the phase of the lift center of the intake valve from a center point between the optimum intake valve open timing (IVO) and the optimum intake valve closure timing (IVC), the phase of the lift center angle being represented by a crank angle measured in an advance angular direction with respect to a bottom dead center.

7. A variable operation intake valve controlling apparatus for an internal combustion engine as claimed in claim 4, wherein the controller further comprises: a determining section that determines whether the operational angle and the phase calculated by the operational angle and the phase calculating section are within ranges of achievable values for the cam operational angle variable mechanism and the phase variable mechanism, respectively; and a correcting section that corrects at least one of intake valve open and closure timings (IVO and IVC) when the corresponding one of the operational angle and the phase is determined to be out of the ranges of achievable values for the corresponding one of the cam operational angle variable mechanism and the cam phase variable mechanism.

8. A variable operation intake valve controlling apparatus for an internal combustion engine as claimed in claim 7, wherein the determining section comprises a phase determining section that determines whether the phase calculated by the operational angle and phase calculating section is within the range of achievable value for the cam phase variable mechanism and the correcting section corrects the intake valve open and closure timings (IVO and IVC) within a limited phase range to provide a most favorable fuel economy.

9. A variable operation intake valve controlling apparatus for an internal combustion engine as claimed in claim 8, wherein the correcting section comprises: a phase angle determining section that determines whether the calculated phase angle is equal to or below a phase angle maximum value; a new intake valve open timing calculating section that calculates a new intake valve open timing from a new operational angle which is a subtraction result of the present operational angle from a predetermined minute angle and the present intake valve closure timing when the phase determining section determines that the phase is in excess of the phase angle maximum value; a generation torque deriving section that derives a generation torque from the new IVO and optimum IVC; a generation torque variation determining section that determines whether the generation torque is substantially equal to the demanded torque; and final intake valve open and closuring timing determining section that determines finally the operational angle at which the phase reaches to the phase angle maximum value and determines the intake valve open and closure timings by which the generation torque is substantially equal to the demanded torque.

10. A variable operation intake valve controlling apparatus for an internal combustion engine as claimed in claim 8, wherein the correcting section comprises an operational angle determining section that determines whether the calculated operational angle is equal to or smaller than an operational angle maximum value; and a fixing section that fixes the calculated operational angle to the operational angle maximum value when the operational angle determining section determines that the calculated operational angle is in excess of the operational angle value.

11. A variable operation intake valve controlling apparatus for an internal combustion engine as claimed in claim 10, wherein the correcting section further comprises: a generation torque calculating section that calculates a generation torque from the optimum intake valve closure timing (IVC) with the operational angle maintained at the operational angle maximum torque; and a comparing section that compares the generation torque with the demanded torque and wherein the correcting section corrects the intake valve closure timing (IVC) until the generation torque becomes substantially equal to the demanded torque.

12. A variable operation intake valve controlling apparatus for an internal combustion engine as claimed in claim 4, wherein the allowable residual gas calculating section calculates the allowable residual gas quantity from a map with the engine speed and the required air quantity as parameters.

13. A variable operation intake valve controlling apparatus for an internal combustion engine, comprising:

cam operational angle variable means which is capable of controlling an operational angle of the intake valve in such a manner that a range of the operational angle is continuously changed;

cam phase variable means which is capable of continuously displacing a phase of a lift center angle of the intake valve; and controlling means for controlling an intake air quantity in accordance with valve timings of the intake valve determined according to the operational angle by the cam operational angle variable means and the phase by the cam phase variable means, the controlling means determining an allowable residual gas quantity from a required air quantity and an engine speed, the required air quantity being determined according to a manipulated variable of accelerator means, calculating optimum intake valve open and closure timings in such a manner that both of the required air quantity and the allowable residual gas quantity enter each cylinder of the engine, and determining the operational angle and the phase from the optimum intake valve open and closure timings.

14. A variable operation intake valve controlling method for an internal combustion engine, the engine comprising: a cam operational angle variable mechanism that is capable of controlling an operational angle of the intake valve in such a manner that a range of the operational angle is continuously changed; and a cam phase variable mechanism which is capable of continuously displacing a phase of a lift center angle of the intake valve, the method comprising:

controlling an intake air quantity in accordance with valve timings of the intake valve determined according to the operational angle by means of the cam operational angle variable mechanism and the phase by means of the cam phase variable mechanism;

determining an allowable residual gas quantity from a required air quantity and an engine speed, the required air quantity being determined according to a manipulated variable of an accelerator;

calculating optimum intake valve open and closure timings in such a manner that both of the required air quantity and the allowable residual gas quantity enter a cylinder of the engine;

and determining the operational angle and the phase from the optimum intake valve open and closure timings.

15. A variable operation intake valve controlling method for an internal combustion engine, the engine comprising: a cam operational angle variable mechanism that is capable of controlling an operational angle of the intake valve in such a manner that a range of the operational angle is continuously changed; and a cam phase variable mechanism which is capable of continuously displacing a phase of a lift center angle of the intake valve, the method comprising: calculating a demanded torque from a manipulated variable of an accelerator; calculating a required air quantity corresponding to the demanded torque; calculating an allowable residual gas quantity from the required air quantity and the engine speed; calculating the optimum valve open and valve closure timings (IVO and IVC) from the residual required air quantity and the allowable residual gas quantity; and calculating the operational angle and the phase from the optimum intake valve open and closure timings.

* * * * *